United States Patent [19]

Henkensiefken et al.

[11] 4,432,499
[45] Feb. 21, 1984

[54] PORTABLE FEED GRINDER-MIXER

[75] Inventors: Larry L. Henkensiefken, Waseca; Douglas L. Pettit; Gerald E. Barry, both of Owatonna, all of Minn.

[73] Assignee: Owatonna Manufacturing Company, Inc., Owatonna, Minn.

[21] Appl. No.: 216,134

[22] Filed: Dec. 15, 1980

[51] Int. Cl.³ ............................................. B02C 19/00
[52] U.S. Cl. .................................. 241/30; 241/101 B; 241/101.7; 366/156; 366/186; 366/603
[58] Field of Search ............... 366/603, 607, 131, 156, 366/158, 186, 190, 318, 266, 292, 195; 241/101 B, 101.7, 30

[56] References Cited

U.S. PATENT DOCUMENTS

| | | |
|---|---|---|
| 1,191,673 | 7/1916 | Davis . |
| 2,236,219 | 3/1941 | Praxter . |
| 2,951,941 | 12/1957 | Schmale . |
| 2,999,617 | 9/1961 | Mast . |
| 3,039,505 | 6/1962 | Mast . |
| 3,129,927 | 4/1964 | Mast . |
| 3,133,727 | 5/1964 | Luscombe . |
| 3,199,796 | 8/1965 | Callum et al. . |
| 3,231,034 | 1/1966 | Callum . |
| 3,254,878 | 6/1966 | Lorenxen . |
| 3,325,106 | 4/1967 | Hoffman, Jr. et al. ...... 241/101.7 X |
| 3,385,985 | 4/1968 | Dodgen et al. . |
| 3,421,740 | 1/1969 | Behrens ........................ 366/603 X |
| 3,840,189 | 10/1974 | Kanengieter et al. . |
| 3,910,508 | 10/1975 | Stauffer et al. ................. 241/101 B |
| 4,026,528 | 5/1977 | Kline et al. ................ 241/101 B X |
| 4,134,690 | 1/1979 | Lindstrom .......................... 366/266 |

FOREIGN PATENT DOCUMENTS 721159 5/1962 Canada ............................. 366/195

Primary Examiner—Mark Rosenbaum
Attorney, Agent, or Firm—Schroeder, Siegfried, Vidas & Arrett

[57] ABSTRACT

Disclosed is a vehicle carrying a grinder-mixer providing a low bin profile and improved mixing through the use of complementing horizontal and vertical circulatory paths of the ground feed, which is produced by a pair of cooperating parallel auger conveyors extending in a horizontal plane along the bottom of the mixing bin in side by side relationship and rotating so as to move the feed in opposite directions, each feeding the other, in cooperation with a pair of vertical cooperating augers spaced axially of the horizontal augers and moving and mixing the ground feed along a circulatory path in vertical planes, the said horizontal and vertical circulatory paths intersecting to thereby greatly increase the mixing action. One of the horizontal augers is connected to a discharging system and is reversible to cooperate with the latter to empty the bin.

28 Claims, 7 Drawing Figures

PORTABLE FEED GRINDER-MIXER

DESCRIPTION

BACKGROUND OF THE PRIOR ART

Portable grinder-mixers have come to relatively common use upon farms. They frequently use hammer mills to grind the feed and, at the same time, mix the ground material with other previously ground food or other additives utilized to enhance the quality of the end-product. Examples of such efforts are seen in U.S. Pat. Nos. 3,129,927; 3,375,985; 3,133,727; 2,815,941; 3,254,878; 3,199,796; 2,236,219; 4,201,348; 4,092,004; 3,369,762; 2,894,733; and 3,840,189. These patents reflect a continuing and previously inadequately-met need for a portable grinder-mixer which will fully mix the ground feed and deliver same to various desired locations. One aspect of this inadequacy has been the characteristically high profile of such a vehicle, which precludes storage of the same within conventional storage buildings, because it is impossible to move such a tall vehicle through doorways of conventional height. The height of such a vehicle has heretofore been prohibitive in this sense, unless the volume thereof were reduced to a level below practical requirements. Moreover, the total mixing action which has been accomplished with such apparatus has, in general, been inadequate.

BRIEF SUMMARY OF THE INVENTION

Disclosed is a vehicle carrying a grinder-mixer providing a low bin profile and improved mixing through the use of complementing horizontal and vertical circulatory paths of the ground feed, which is produced by a pair of cooperating parallel auger conveyors extending in a horizontal plane across the bottom of the mixing bin in side by side relationship and moving material in opposite directions, each feeding the other in cooperation with a pair of vertical cooperating augers spaced axially of the horizontal augers and moving and mixing the ground feed along a circulatory path in vertical planes, the said horizontal and vertical circulatory paths intersecting to thereby greatly increase the mixing action. One of the horizontal augers is connected to a discharging system and is reversible to cooperate with the latter to empty the bin.

It is a general object of the invention to provide a new and improved portable grinder-mixer which has a low profile and yet meets practical capacity requirements.

Another important object of the invention is to provide a new and improved portable grinder-mixer which has a low profile and produces greater mixing action than those heretofore known.

Another object is to provide a new and improved grinder-mixer which produces intersecting vertical and horizontal paths of movement of the ground feed within the bin, thereby greatly enhancing the mixing action.

Another object is to provide a low profile grinder-mixer which enhances the mixing action sufficiently to permit the use of a bin bottom of substantially greater width, thereby markedly increasing the capacity of the lower portions of the bin and providing the required practical bin capacity to permit use of a bin with side wall of lower height.

These and other objects will be apparent from a study of the specification and drawings.

DETAILED DESCRIPTION OF THE INVENTION

One embodiment of our invention, as shown in FIGS. 1-6, inclusive, includes a wheeled vehicle 7 having a frame 8 which is adapted as at 9 to be attached in drawn relation to a tractor (not shown). The tractor has the conventional power take-off shaft which is joined to shaft 10 which is utilized to provide all of the power for the grinder-mixer, as hereinafter described.

Figure 6:
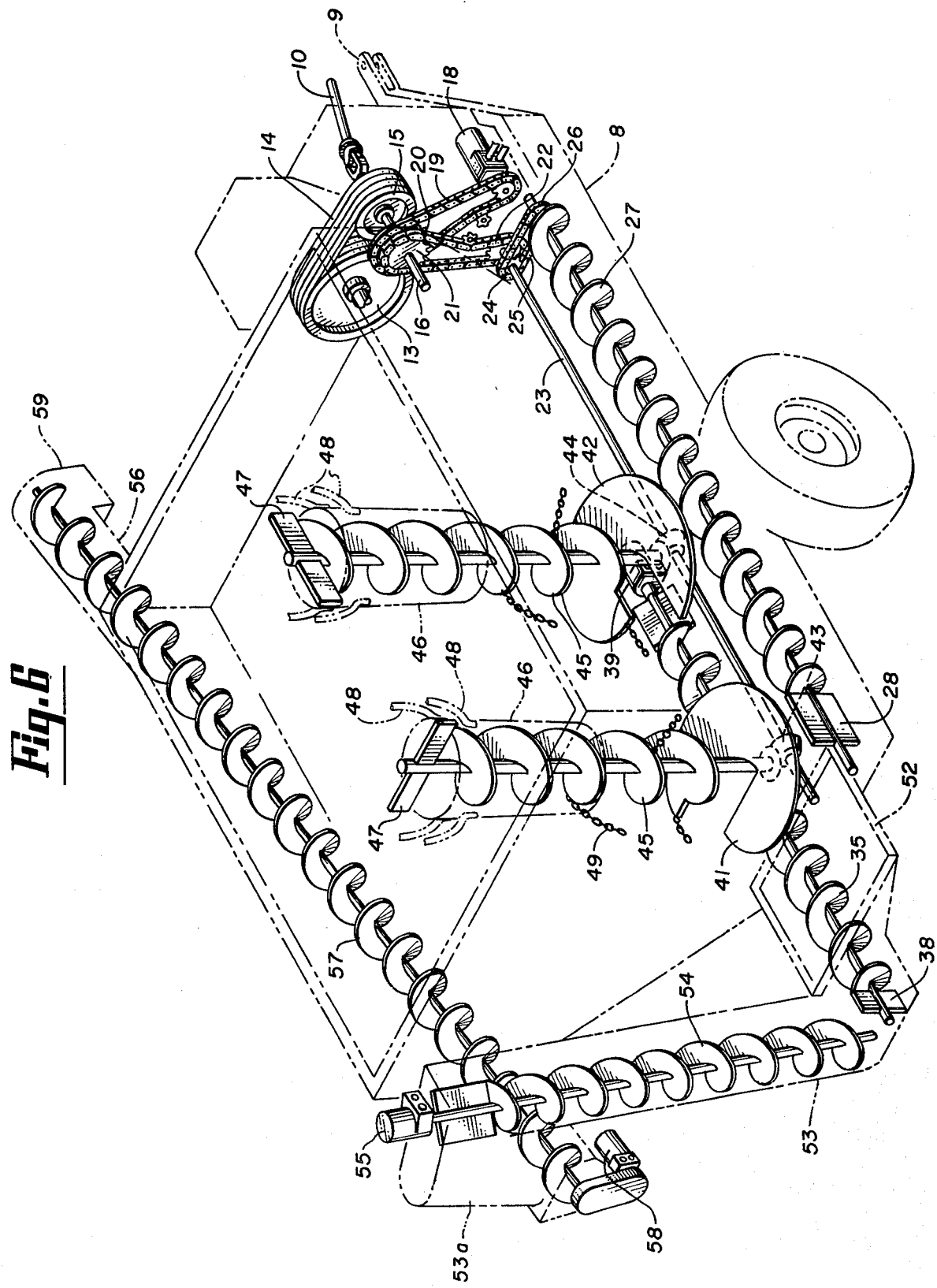
FIG. 6 is a diagrammatic view illustrating the relationship between the conveyor assemblies.

Mounted upon the frame 8 at its forward end is a hammermill 11 of any conventional type such as shown in any one of the patents referred to hereinabove. The hammer portion of hammermill 11 is mounted for rotation about a shaft 12, which carries a fly wheel 13, which is driven by belts 14, which extend around drive pulley 15, carried upon drive shaft 16, which is connected to the power take-off 10, as shown in FIG. 6. A cyclone 17 is mounted on the hammermill 11 and delivers cyclone collected material thereto.

Figure 4:
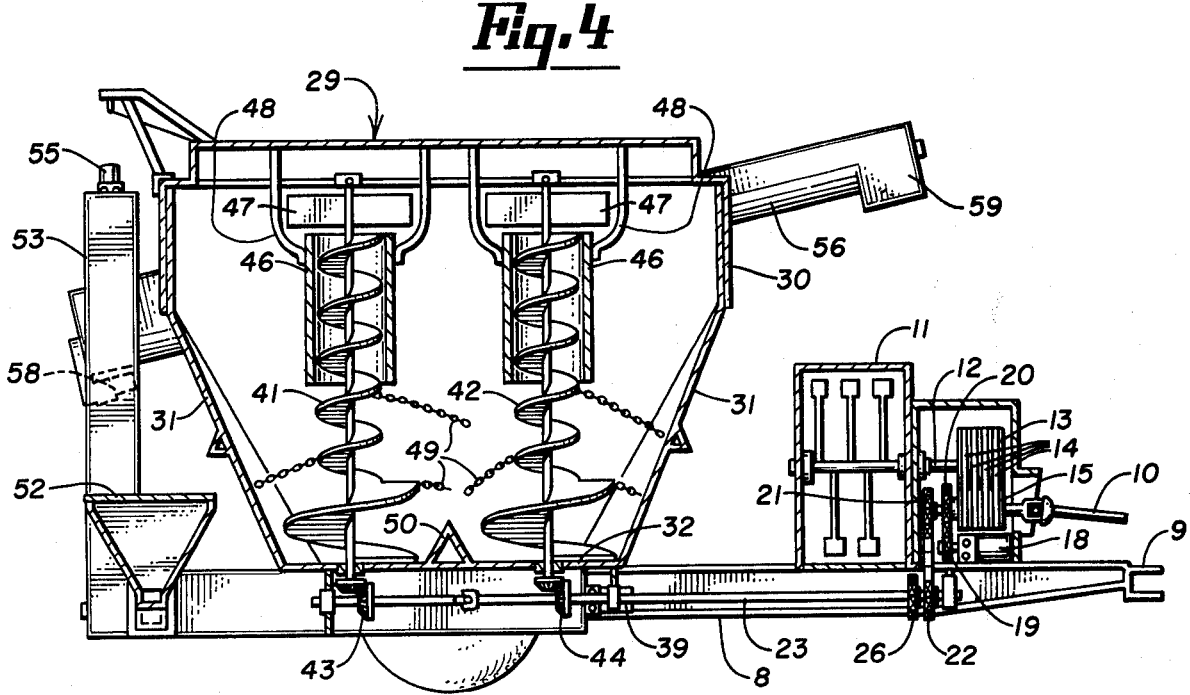
FIG. 4 is a vertical sectional view thereof, taken along line 4—4 of FIG. 2.

A hydraulic pump 18 is also carried by the frame 8 and is driven by a chain or belt 19, which in turn is driven by a drive pulley or gear 20, which is carried by the drive shaft 16. Also driven by the drive shaft 16, through a gear 21 and chain 22, is a jack-shaft 23 which is mounted upon the frame 8 at a substantially lower level than the mill 11, includes a universal joint as shown in FIGS. 4, 6 and extends rearwardly therefrom to the rear end of the vehicle. Jack-shaft 23 carries a gear 24 which drives a chain 25 and gear 26, the latter driving a single direction in-feed auger conveyor 27.

Figure 5:
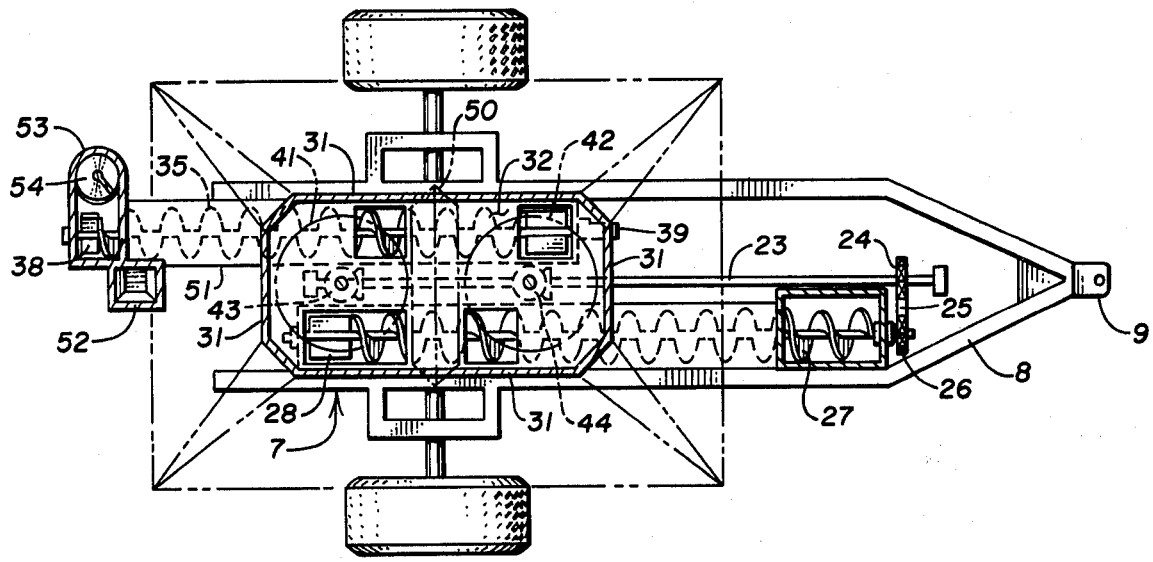
FIG. 5 is a horizontal sectional view thereof, taken along line 5—5 of FIG. 1.

The conveyor 27, like the jack-shaft 23, extends to the rearward end of the vehicle and is parallel to the jack-shaft. This conveyor 27 originates directly below the mill 11 and receives ground feed therefrom as best shown in FIG. 5. At its rearward end, it carries a pair of paddles 28 which extend radially outwardly therefrom in opposite directions.

Figure 1:
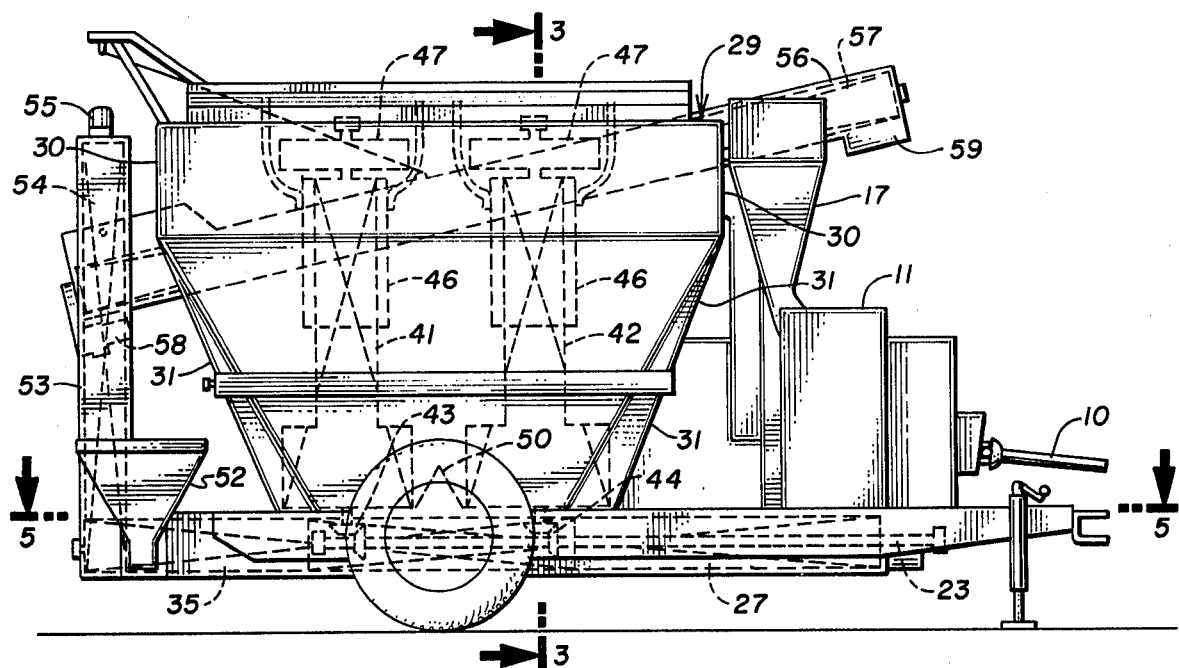
FIG. 1 is a side elevational view of our improved portable grinder-mixer.
Figure 2:
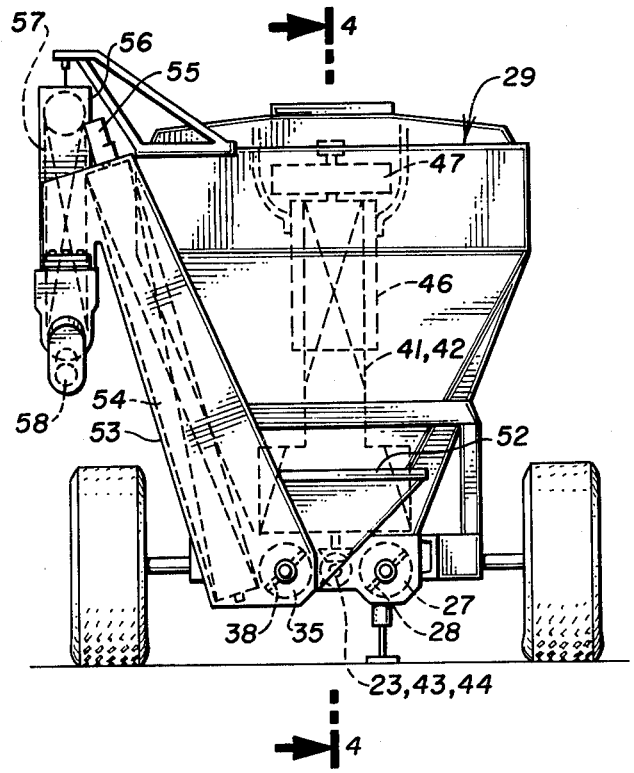
FIG. 2 is a rear end elevational view thereof.

Mounted on the frame 8 directly above the conveyor 27 is a mixing bin or tank 29. This bin 29 is rectangular in horizontal cross-sectional configuration and has upper vertical sidewalls 30 and inwardly sloping lower sidewalls 31, as best shown in FIGS. 1 and 2. It also has a bottom 32 which extends above a pair of elongated parallel troughs 33, 34 which are disposed immediately therebelow. Within trough 34 is the single direction rotatable infeed conveyor 27.

Figure 3:
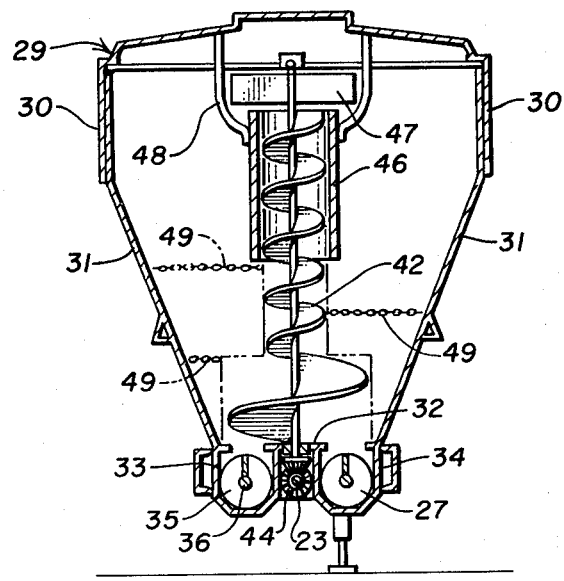
FIG. 3 is a vertical sectional view thereof, taken along line 3—3 of FIG. 1.

In the opposite trough 33, there is mounted a parallel reversible auger 35 which progresses feed in an opposite direction relative to the auger 27, during the mixing operation, and in the same direction during the ground-feed discharging operation. The conveyor 35 is mounted for rotation about a shaft 36 which extends parallel to the shaft of the auger 27 and is mounted on the frame directly below the bin 29 as best shown in FIGS. 3 and 5.

It will be noted that the bottom 32 of the bin 29 is imperforate in the area between the two troughs 33 and 34 and directly above the jack-shaft 23. It will also be noted that the width of the bottom 32 is slightly greater than ⅓ of the width of the bin 29, when measured in the same transverse direction relative to the two augers 27 and 35. It will be seen, by reference to FIG. 6, that the auger 35 extends rearwardly and carries paddles 38 upon its rearward end similar to the paddles 28 on auger 27. The shaft 36 and the auger 35 are driven by a hydraulic reversible orbit motor 39 which receives its hydraulic fluid under pressure from the pump 18 by way of a hydraulic circuit as hereinafter described.

Mounted within the bin as best shown in FIGS. 1, 4 and 5 is a pair of vertical mixing augers 41 and 42. These augers are driven by bevel gears 43 and 44 respectively which are carried by the shaft 23, as clearly shown in FIG. 6 and FIGS. 3 and 4. Each of these vertical mixing augers 41 and 42 has a flight of relatively large diameter which originates directly above the bottom 32 of the bin and moves the ground material upwardly to flights having a relatively shorter radius as at 45. Each of the two vertical augers 41 and 42 extends upwardly through a hollow sleeve such as is indicated by the numeral 46 and terminates at the upper end thereof. Each carries distributing paddles 47 at its upper end. As shown, the sleeves 46 are fixedly mounted in depending relation upon the roof of the bin and are secured thereto by depending strap support structure 48. Each of the vertical mixing augers may also carry a plurality of chains 49 which are secured to the various flights of the augers 41 and 42 below the sleeves 46 and, upon rotation of the augers, swing outwardly to effectively preclude bridging therearound.

Mounted upon the bottom 32 of the bin 29 is an inverted V-shaped divider 50 which extends transversely of the augers 27, 35 and is positioned between the lower ends of the two vertical mixing augers 41, 42. This divider effectively divides the bin 29 into a pair of adjacent and communicating bins. It will be noted that the divider 50 extends outwardly to a position immediately adjacent to the path of the lower flights of the vertical mixing augers 41 and 42, so as to cooperate therewith for effectively lifting and mixing the group material engaged by these flights and so as to divert descending material moving from one vertical auger to the other and thereby provide cross-mixing.

As best shown in FIG. 5, the rear end portion of the auger 35 rotates within a discharge trough 51 which supports an additive hopper 52, through which food additives may be added as desired since the interior thereof communicates with the interior of the trough 51 for that purpose.

The discharge trough 51 is connected to and communicates with a lift conveyor 53 which includes a vertical auger 54 that is driven by a hydraulic lift motor 55, as illustrated in FIG. 6. It will be noted that the auger 54 receives materials from the paddles 38 carried at the rear end of the auger 35.

The lift conveyor 53 discharges into a shroud 53a which is connected to a swingably mounted distribution conveyor 56 throughout which a distribution auger 57 extends. The auger 57 is driven by a hydraulic motor 58 as best shown in FIG. 6 to effectively carry the material outwardly to its discharge end portion 59, which can be swung freely as desired to discharge the mixed ground-feed at various locations surrounding the vehicle.

In operation the feed to be ground is fed into hammermill 11 and is effectively ground to the desired consistency. The ground feed is received therefrom by the forward end of the trough 34, and it is progressed therethrough by the infeed conveyor 27 until it reaches the openings in the bottom 32 of the bin. As it reaches the first opening (as best seen in FIG. 5), some of the ground-feed escapes the trough 34 and moves upwardly through the opening, at which point it is engaged by the auger 42 and elevated thereby.

The remainder of the ground-feed continues to move along with the flights of the conveyor 27 to the opening in the bottom (as shown in FIG. 5) opposite the mixing auger 41, at which point it is forced upwardly as a result of the continued feeding of ground material by the flights of the auger 27 from the forward end of the vehicle. The paddles 28 effectively clear the rear end of the trough 34 and continually force such ground feed upwardly into the path of the rotating mixing auger.

As the mixing augers 41 and 42 continue to rotate, the ground material is carried upwardly to the opposite side and is engaged by the circulating auger 35 and is carried forwardly thereby to the forward end of the bin, at which point it is forced upwardly into the bin by the paddles at the front end of the auger 35. At that point the mixing auger 42 engages and elevates such material and carries it upwardly and toward the opposite side of the bottom.

As the bin continues to fill, the ground material is carried upwardly by the augers 41 and 42 through the sleeves 46 and is flung radially outwardly by the paddles 47. Since the mixing augers 41 and 42 rotate relatively rapidly, each cooperates to produce an effective mixing action by throwing material radially outwardly, descending into the path of the adjacent mixing auger and, since it lifts the material to an elevation adjacent the top of the bin, a definite circulatory action in a vertical plane is produced. The feed which is flung outwardly to the vertical sidewalls 30 descends along the inwardly sloping lower sidewalls 31 to a position at which the relatively large flights of the mixing augers will again engage the same and elevate and further mix the material with additional ground feed being forced upwardly into the bin by the underlying infeed auger 27.

It will be noted that the infeed auger 27 and the parallel horizontally extending auger 35 carry the ground feed in a circulatory path in a horizontal plane, and that this horizontal circulatory path intersects the vertical circulatory path of the mixing augers. Thus, the ground feed is mixed and cross-mixed as a result of being moved in a horizontal circulatory path which intersects vertical circulatory paths, produced by the vertical mixing augers 41, 42 which are spaced longitudinally of the parallel horizontal augers 27 and 35.

Thus the mixing operation is completed by the repeated carrying of the ground feed engaged by the auger 42 to the area above the auger 35 and mixed thereat with the ground material which is forced upwardly by the latter at its forward end, and by the carrying of the material from the end of the auger 27, to the opposite side and upwardly, by the mixing auger 41, and by the interaction of the two vertical mixing augers 41 and 42 as they carry the material upwardly and fling it outwardly and into the path of each other.

When the mixing is completed, the material is ready to be discharged to the desired location. This is accomplished by reversing the reversible motor 39 which reverses the direction of rotation of the auger 35 and carries the material rearwardly to its paddles 38 which force the material into the lift conveyor 53. This conveyor 53 in turn carries the ground material upwardly and discharges the same into the shroud 53a. From the shroud 53a, the material descends into the distribution conveyor 56 and is carried outwardly through the discharge 59 as a result of the conveying action of the auger 57 which is driven by the hydraulic motor 58. Since the distribution conveyor 56 can be swung across a wide arc, it is possible to distribute the ground feed to a large number of desired locations in the area surrounding the vehicle.

Figure 7:
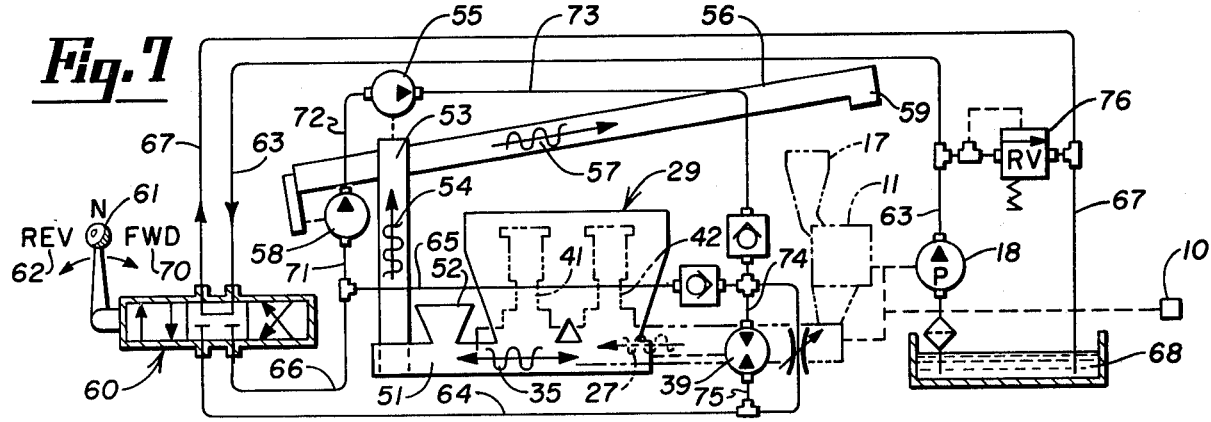
FIG. 7 is a schematic diagram illustrating the hydraulic circuit utilized therein.

FIG. 7 illustrates the hydraulic circuit which is utilized in conjunction with the hydraulic pump 18 to drive the hydraulic motors identified above. At the rear of the vehicle there is a four-way control valve 60 which is preferably a Gresen valve 410-NR. This valve is interposed within the hydraulic circuit which is connected to the pump 18 as shown therein. When it is desired to grind and mix feed, the control lever 61 is moved to the forward position identified by the numeral 70. The hydraulic fluid under pressure flows through line 63 from the pump 18, through the valve 60 which connects the line 63 with line 64, which carries the fluid through hydraulic motor 39 with line 64, which in turn drives the auger 35 so as to carry the ground material forwardly. From the motor 39, the fluid travels back to the valve 60 through lines 65 and 66, and thence through line 67 to the supply tank 68. Simultaneously, the food to be ground is fed into the hammermill 11 from whence it proceeds, after being ground, into the auger 27 which is driven by the linkage connecting the same with the power take-off 10, as hereinbefore described. At the same time, the vertical mixing augers 41 and 42 are being driven by the jack-shaft 23 and the linkage hereinbefore described which connects the same with the power take-off.

If it is desired to add a food additive to the ground feed, such additive is placed in the additive bin or hopper 52 during the mixing operation and it is carried forwardly by the auger 35 and progressively mixed with the ground feed as it is circulated in the horizontal circulatory path created by the two augers 27 and 35 and, of course, is later introduced thereby into the vertical circulatory paths provided by the vertical mixing augers 41 and 42.

After a sufficient supply of food has been ground and mixed as described above, and when it is desired to distribute the same, the control lever 61 may be shifted to the reverse position indicated by the numeral 62. This causes the fluid which is pumped by the pump 18 through the line 63 to pass into line 66 and thence through line 71 to hydraulic motor 58, thence through line 72 to lift motor 55, thence through line 73 and line 74, and through reversible motor 39, which drives the auger 35 in the opposite direction as compared to that which is utilized during the mixing operation. Upon leaving the motor 39, the fluid passes through line 75, back through line 64 and line 67 to the supply tank 68. Numeral 76 indicates a relief valve arrangement.

From the above description it can be seen that we have provided a unique mixing mechanism which will mix ground feed in a highly improved and effective manner through the use of a set of horizontal parallel augers which lie in the same horizontal plane and create a horizontal circulatory flow of the ground feed. We also provide a pair of parallel vertically extending mixing augers which are confined within the vertical plane of the horizontal augers and are disposed immediately thereabove to engage, remove, and elevate ground feed received from the horizontal augers and carry the same upwardly to a point adjacent the top of the mixing bin and to then fling the same outwardly to induce cross-mixing and circulatory flow in vertical paths which intersect the horizontal circulatory flow of the horizontal augers. It will also be noted that through the use of the paralled horizontal augers in combination with the pair of vertical mixing augers, which are spaced longitudinally of the horizontal augers, it is possible to utilize a mixing bin which is rectangular in shape, since the cooperative action of the augers preclude bridging. Moreover, the relatively wide bottom of the bin, which is provided through the use of the pair of horizontal augers, increases the capacity of the bin markedly and this fact, together with the rectangular shape, permits the use of a bin of relatively low height, since the practical capacity requirements will be met without the extent of height normally required in such machines. As a consequence, our portable grinder-mixer can be readily stored in conventional machinery storage sheds and it is no longer necessary to provide costly separate shelters therefor or, in the alternative, permit the grinder-mixer to remain outside at all times.

The low profile afforded by our machine has the added advantage of providing a much more adequate view for the driver of the tractor, in that his view is relatively unobstructed during backing-up operations which are frequently utilized in locating the grinder-mixer at a desired location.

It will be seen by reference to FIG. 4 that if even greater capacity is desired, it can be obtained by merely extending the vertical side wall 30 of the bin 29 upwardly; and also the augers 41 and 42 so that their upper ends will terminate adjacent the upper ends of the tubes 46, just as they are shown in FIG. 4.

It will, of course, be understood that various changes may be made in the form, details, arrangement and proportions of the parts without departing from the scope of the invention which consists of the matter shown and described herein and set forth in the appended claims.

We claim:

1. A feed grinder-mixer comprising:
   (a) a vehicle;
   (b) feed grinding mechanism mounted on said vehicle;
   (c) a mixing bin carried by said vehicle and connected to said feed grinding mechanism in ground feed-receiving relation;
   (d) first power-driven mixing mechanism in communication with the interior of said bin and constructed and arranged to move and mix such ground feed in a circulatory path in a generally horizontal plane;
   (e) second power-driven mixing mechanism mounted within said bin directly above and in close ground-feed-receiving relation with said first mixing mechanism and being constructed and arranged immediately above said first mechanism in close proximity thereto so as to move, mix and cross-mix such ground feed in a circulatory path in a generally vertical plane, which path intersects said horizontal circulatory path;

(f) power-driven unloading mechanism connected to said bin in ground-feed-receiving relation for conveying the ground-feed away therefrom after it has been so mixed by said mixing mechanisms.

2. The structure defined in claim 1 wherein said first mixing mechanism is comprised of a pair of parallel horizontal augers located directly below and immediately adjacent to said second mixing mechanism and driven so as to move the feed in opposite directions.

3. The structure defined in claim 2 wherein said second mixing mechanism is comprised of a pair of cooperating vertically extending augers spaced axially of and between the axes of said horizontal augers.

4. The structure defined in claim 3 and a divider mounted within said bin between the lower end portions of said vertically extending augers and above said first mechanism and effectively dividing said bin into a pair of adjacent communicating bins between which such ground feed is interchanged by said mixing mechanisms.

5. The structure defined in claim 3 wherein said vertically extending augers are disposed within the vertical confines of said horizontal augers.

6. The structure defined in claims 3 wherein said bin is generally rectangular in horizontal cross-sectional shape and said mixing bin has a bottom across which said horizontal augers extend, the width of said bottom measured transversely of said horizontal augers being at least one-third of the dimensions of said bin when measured in the same direction whereby said bin has maximum volume and the grinder-mixer may have a low profile.

7. The structure defined in claim 2 wherein one of said horizontally extending augers is reversible in its direction of rotation and is connected to said unloading mechanism in ground-feed delivering relation when so reversed.

8. The structure defined in claim 1 wherein said second mixing mechanism is comprised of a pair of cooperating vertically extending augers spaced longitudinally of and within the vertical confines of said first mixing mechanism.

9. A ground-feed mixer comprising:
(a) a bin constructed and arranged to receive ground-feed therein;
(b) first power-driven feed-mixing mechanism connected with said bin and constructed and arranged to engage, move and mix such ground-feed in a circulatory path in a generally horizontal plane along the bottom of said bin; and
(c) second power driven feed-mixing mechanism mounted within said bin, in ground-feed-receiving relation with said first mixing mechanism, and being constructed and arranged directly above and in close proximity to said first feed mixing mechanism to cooperatively move, mix and cross-mix such ground-feed from that horizontal plane, in a circulatory path in a generally vertical plane to the upper portions of said bin;
(d) said horizontal and vertical paths of circulation of ground feed intersecting whereby the feed moved by said mechanisms are cross-mixed.

10. The structure defined in claim 9 wherein said first power-driven feed-mixing mechanism is comprised of a pair of parallel interacting augers mounted along the lower portions of said bin and constructed and arranged to drive the ground feed in opposite directions to cooperatively mix the feed therein and move the same along a circulartory horizontal path.

11. The structure defined in claim 10 wherein at least one of said augers is constructed and arranged to be selectively reversibly driven for discharge of the ground-feed from the bin.

12. The structure defined in claim 10 wherein the augers of said first feed-mixing mechanism are each mounted in feed-receiving and discharging relation to the other.

13. The structure defined in claim 9 wherein said first feed-mixing mechanism is constructed and arranged to move such feed along a circulatory path which is generally elliptical in shape.

14. The structure defined in claim 9 wherein said second power-driven feed-mixing mechanism is comprised of a pair of spaced interacting vertically extending augers mounted in said bin directly above said first mechanism and extending upwardly from said first feed-mixing mechanism in feed-receiving relation thereto and constructed and arranged to be driven to cooperatively move, mix and cross-mix the feed in the bin upwardly and outwardly along a circulatory path in a vertical plane, which path intersects said horizontal path of said first mixing mechanism.

15. The structure defined in claim 14 wherein said pair of augers are spaced longitudinally of said first power-driven feed-mixing mechanism.

16. The structure defined in claim 14, and a divider mounted within said bin above said first mechanism and between the lower end portions of said augers.

17. The structure defined in claim 14 and a plurality of chains carried by the individual flights of said vertically extending augers and cooperatively stirring and mixing the ground feed therearound as said augers are rotated.

18. The structure defined in claim 14 and a divider mounted within said bin between the lower end portions of said augers and extending transversely of said first feed-mixing mechanism and effectively dividing said bin into a pair of communicating adjacent bins between which such ground-feed is exchanged by said feed-mixing mechanisms.

19. The structure defined in claim 9 wherein said second feed-mixing mechanism is mounted above and adjacent to said first ground-feed-mixing mechanism in feed-receiving relation thereto and within the vertical confines thereof.

20. The structure defined in claim 9 wherein said bin is generally rectangular in horizontal cross-sectional shape and has a top and bottom area and said first mixing mechanism is comprised of a pair of spaced cooperating parallel augers extending horizontally along said bottom area and constructed and arranged to move such ground-feed along a circulatory path, the width of said bottom area measured transversely of said augers being approximately one-third of the width of said bin measured in the same direction.

21. The structure defined in claim 20 wherein the width of said bottom area measured transversely of said augers is at least one-third of the width of said bin measured in the same direction.

22. The structure defined in claim 20 wherein the width of said bottom area measured transversely of said augers is greater than one-third of the width of said bin measured in the same direction.

23. The method of mixing ground feed within a bin having vertically extending upper sidewalls and having lower sidewalls sloping downwardly and inwardly therefrom, comprising:
(a) moving and mixing portions of such ground feed within said bin and circulating the same in an annular circulation along a generally horizontal plane adjacent the lower portions of said bin sidewalls and along the periphery thereof while
(b) simultaneously and separately moving and mixing portions of such ground feed from said horizontal annular circulation directly upwardly therefrom along a generally vertical plane from a position directly above the horizontal annular circulation of such first portions to the upper and outermore areas of the bin and thence downwardly along the sloping sidewalls of the bin into the generally horizontal annular circulation of such first portions.

24. The method defined in claim 23 wherein said ground feed is augered in its horizontal annular circulation along the periphery of the lower portions of the sidewall of the bin.

25. The method defined in claim 23 wherein portions of the ground feed as they move in their horizontal annular circulation are engaged and augered upwardly and outwardly in a generally vertical plane to the upper areas of the bin.

26. The method defined in claim 23 wherein the said annular circulations of such ground feed, moving in a horizontal and in a vertical plane, intersect.

27. A method of mixing ground feed within a bin comprising:
(a) augering portions of such ground feed in a horizontal annular circulation along a generally horizontal plane adjacent the bottom of the bin, while
(b) simultaneously and separately augering at least some of such portions of such feed upwardly and outwardly from a position directly above the annular circulation of such first portions of ground feed to the upper and outermore areas of the bin and in a generally vertical annular circulation along a vertical plane disposed directly above the horizontal annular circulation, and
(c) augering such ground feed so as to cause said annular circulations to intersect and such feed to cross-mix between said paths.

28. A method of mixing ground feed within a bin comprising:
(a) mechanically moving and mixing portions of such ground feed in an annular circulation along a generally horizontal plane adjacent the bottom of the bin, while
(b) simultaneousely and separately mechanically moving and mixing portions of such moved ground feed from a position directly above said annular circulation directly upwardly and outwardly in an annular circulation along a vertical plane, said position being within the horizontal annular circulation of such first portions of such ground feed and such first portions moving to a second and relatively remote position within said horizontal annular circulation.

* * * * *

UNITED STATES PATENT AND TRADEMARK OFFICE
CERTIFICATE OF CORRECTION

PATENT NO. : 4,432,499

DATED : February 21, 1984

INVENTOR(S) : Larry L. Henkensiefken et al

It is certified that error appears in the above-identified patent and that said Letters Patent are hereby corrected as shown below:

Column 1, line 7, delete "to" and insert - into -

Column 3, line 47, delete "group" and insert - ground -

Column 4, line 23, before "to the" insert - and -

*Signed and Sealed this*

*Twenty-first* Day of *August 1984*

[SEAL]

*Attest:*

GERALD J. MOSSINGHOFF

*Attesting Officer*     *Commissioner of Patents and Trademarks*